United States Patent [19]
Nishikawa et al.

[11] Patent Number: 5,532,756
[45] Date of Patent: Jul. 2, 1996

[54] COLOR VIDEO SIGNAL DETECTOR AND COLOR VIDEO SIGNAL DETECTING METHOD

[75] Inventors: Katuhiko Nishikawa; Hiroya Ikeda; Hidenori Hirai; Yoshio Ogawa, all of Aichi, Japan

[73] Assignee: Sony Corporation, Tokyo, Japan

[21] Appl. No.: 381,712

[22] Filed: Jan. 31, 1995

[30] Foreign Application Priority Data

Feb. 1, 1994 [JP] Japan .................................. 6-010305
Jul. 21, 1994 [JP] Japan .................................. 6-169153

[51] Int. Cl.$^6$ ............................. H04N 9/68; H04N 5/208
[52] U.S. Cl. ................................. 348/630; 348/625
[58] Field of Search ................................. 348/625, 630, 348/252, 253, 26; 358/166, 37, 96, 532, 534; 382/199, 162; H04N 5/208, 9/68

[56] References Cited

U.S. PATENT DOCUMENTS 5,164,829 11/1992 Wada ........................ 348/625
5,204,747 4/1993 Shinkai ........................ 348/625

FOREIGN PATENT DOCUMENTS 0198692 10/1986 European Pat. Off. .

*Primary Examiner*—Safet Metjahic
*Assistant Examiner*—Sherrie Hsia
*Attorney, Agent, or Firm*—Jay H. Maioli

[57] ABSTRACT

A color video signal detector that detects the color level and the color phase of a color video signal includes a differentiating circuit that differentiates a color video signal to detect edges in the color video signal, a switching IC that holds values of the color video signal at times after a given time interval from the edges, a circuit that counts the order of the edges and extracts the value of the color video signal at every count, and a microcomputer that measures the extracted values of the color video signal.

5 Claims, 6 Drawing Sheets

(a) BLUE PRIMARY COLOR SIGNAL (b) DIFFERENTIATED SIGNAL (c) OUTPUT PULSE OF THE COMPARATOR (d) GATE SIGNAL (e) PULSE OF THE BLUE PRIMARY COLOR SIGNAL FOR TIMING THE WHITE BAR (f) PULSE OF THE BLUE PRIMARY COLOR SIGNAL FOR TIMING THE CYAN BAR (g) PULSE OF THE BLUE PRIMARY COLOR SIGNAL FOR TIMING THE MAGENTA BAR (h) PULSE OF THE BLUE PRIMARY COLOR SIGNAL FOR TIMING THE BLUE BAR (a) COLOR BARS (b) PRIMARY COLORS

COLOR VIDEO SIGNAL DETECTOR AND COLOR VIDEO SIGNAL DETECTING METHOD

BACKGROUND OF THE INVENTION

1. Field of the Invention

The present invention relates to a method of detecting a color level and a color phase on the basis of a color video signal and a color video signal detector for carrying out the method.

2. Description of the Related Art

In a television set for displaying images, a color level and a color phase of a color video signal are detected by extracting a blue primary color signal included in a color bar signal. As shown in (a) of FIG. 5, the color bar signal represents, for example, in order of luminance, a white bar, a yellow bar, a cyan bar, a green bar, a magenta bar, a red bar and a blue bar, and color signals representing those color bars are produced by mixing primary color signals, i.e., a green primary color signal, a red primary color signal and a blue primary color signal as shown in (b) of FIG. 5 by an additive color mixing method; that is, a white color bar is produced by mixing green, red and blue primary color signals, a yellow bar is produced by mixing green and red primary color signals, a cyan bar is produced by mixing green and blue primary color signals, and a magenta bar is produced by mixing red and blue primary color signals.

When the color bar signal is regulated correctly, the level of the blue primary color signal is the same at positions for the white, the cyan, the magenta and the blue bar of the color bar signal as shown in (b) of FIG. 5, and the blue primary color signal is given every other color bar when the color bars are arranged in order of luminance. In the aforesaid arrangement of the seven color bars or an arrangement of eight color bars including a black bar in addition to the seven color bars, it is common practice to provide the blue primary color signal, a gate signal which becomes active whenever the four color bars, i.e., the white, the cyan, the magenta and the blue bars, appear, and to assume that the respective widths of the color signals are the same. The levels of the blue primary color signal for the white, the cyan, the magenta and the blue bars are then extracted to detect the color level and the color phase of a color video signal.

However, since the gate signal is generated on an assumption that the widths of the color signals are the same and is not synchronized with the color bar signal, there is a possibility that there are times when the gate signal becomes active which are not synchronous with the blue primary color signal.

Since the seven-color bar signal and the eight-color bar signal are different from each other when the blue primary color signal is provided, the color level and the color phase of the color video signal cannot be detected by using the same gate signal, and the conventional color video signal detector needs to generate a plurality of gate signals and hence the color video signal detector has a comparatively large number of operations. It goes without saying that there still remains a problem in timing the gate signal even if a plurality of gate signals are provided.

SUMMARY OF THE INVENTION

The present invention has been made in view of the foregoing problems in the conventional video signal detector and it is therefore an object of the present invention to disclose a color video signal detector having a simple configuration and capable of positively detecting the color level and the color phase of a color video signal, and to disclose a color video signal detecting method to be carried out by the color video signal detector.

With the aforesaid object in view, the present invention provides a color video signal detector for detecting color level and color phase of a color video signal, comprising a differentiating circuit 1, i.e., an edge detection means for detecting edges in the color video signal, a switching IC 5, i.e., an extraction means for holding values of the color video signal at times after a given time interval from the edges, counting the order of the edges and extracting the value of the color video signal at every count, and a microcomputer 10, i.e., a measurement means for measuring the extracted values of the color video signal.

The present invention also provides a color video signal detecting method that detects color level and color phase on the basis of a color video signal, comprising: a step S1 of detecting edges in the color video signal, a step S4 of holding values of the color video signal at times after a given time interval from the edges, counting the order of the edges, and extracting the value of the color video signal at every count, and a step S5 of measuring the extracted values of the color video signal.

The color video signal detector in accordance with the present invention has a simple configuration and is capable of positively detecting the color level and the color phase of a color video signal by detecting edges in the color video signal using the edge detection means, holding values of the color video signal at times a given time from the edges, counting the order of the edges and extracting the held values of the color video signals at every count by the extracting means, and measuring the extracted values of the color video signal using the extraction means.

The color video signal detecting method in accordance with the present invention is capable of positively detecting the color level and the color phase of a color video signal by using a color video signal detector having a simple sequence of steps which include detecting edges in the color video signal, holding values of the color video signal at times after a given time interval from the edges, counting the order of the edges, extracting the held values of the color video signal at every count, and measuring the extracted values of the color video signal.

BRIEF DESCRIPTION OF THE DRAWINGS

The objects, features and advantages of the present invention will become more apparent from the following description taken in connection with the accompanying drawings, in which.

DETAILED DESCRIPTION OF THE PREFERRED EMBODIMENTS

Figure 1:
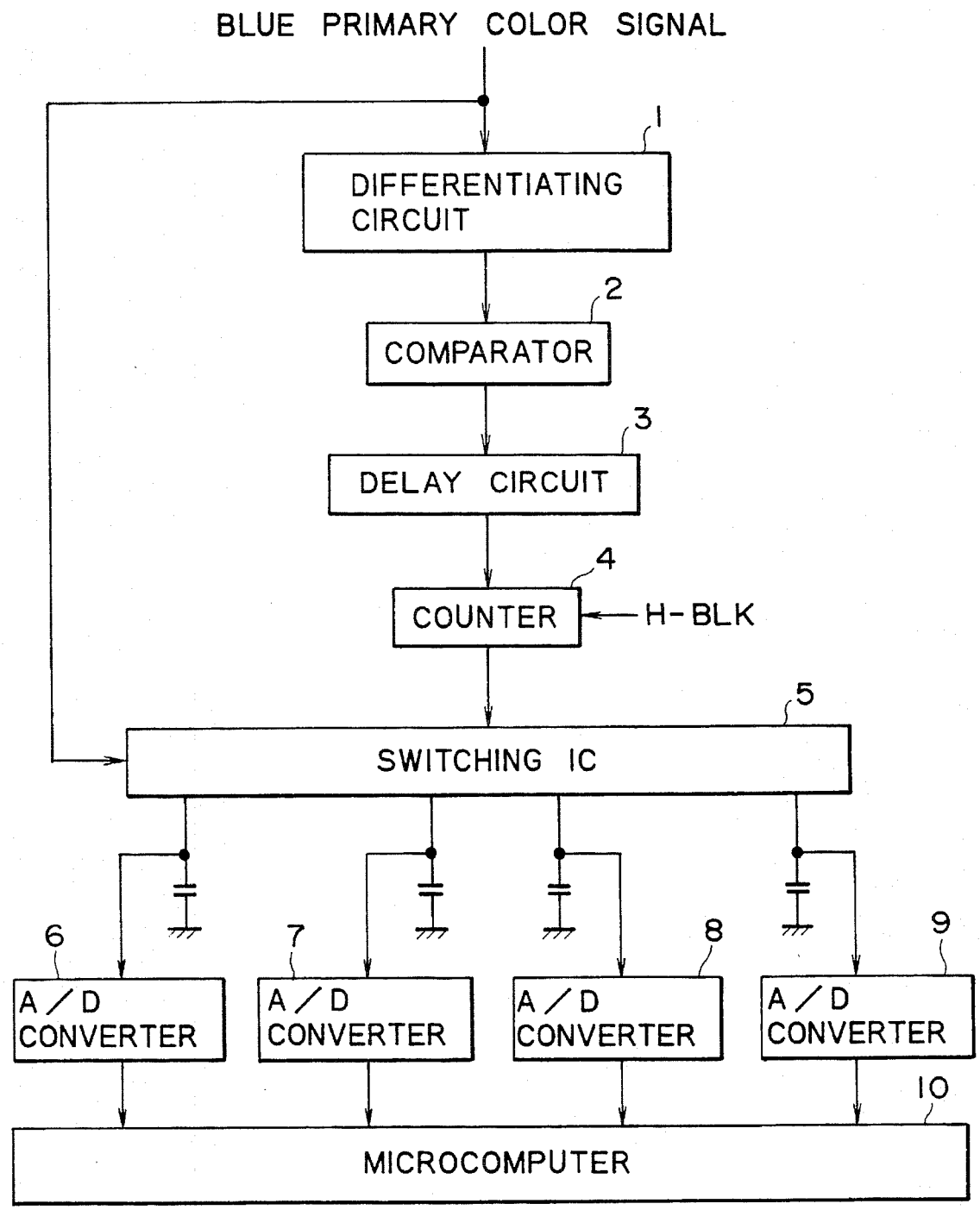
FIG. 1 is a block diagram of a color video signal detector in a preferred embodiment according to the present invention.
Figure 2B:
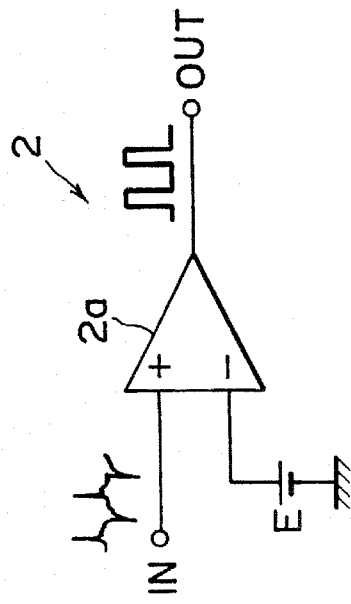
FIGS. 2A to 2F are circuit diagrams of a differentiating circuit, a delay circuit, a counter and a switching IC, respectively, included in the color video signal detector of FIG. 1.
Figure 2D:
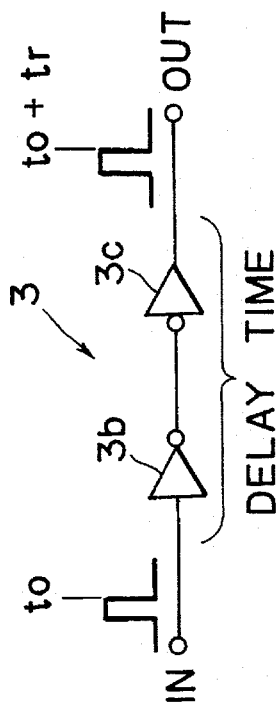
Figure 2A:
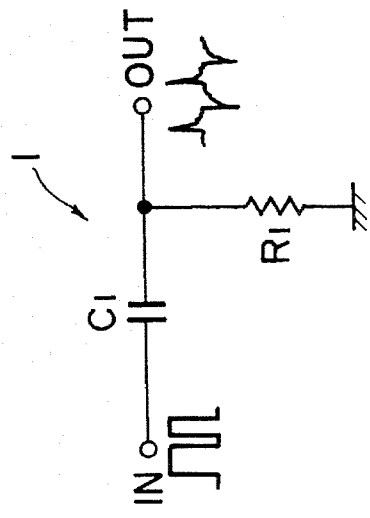
Figure 2C:
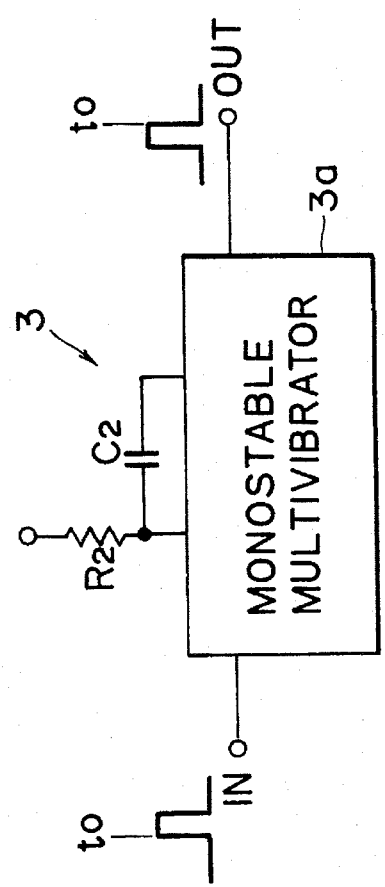
Figure 2E:
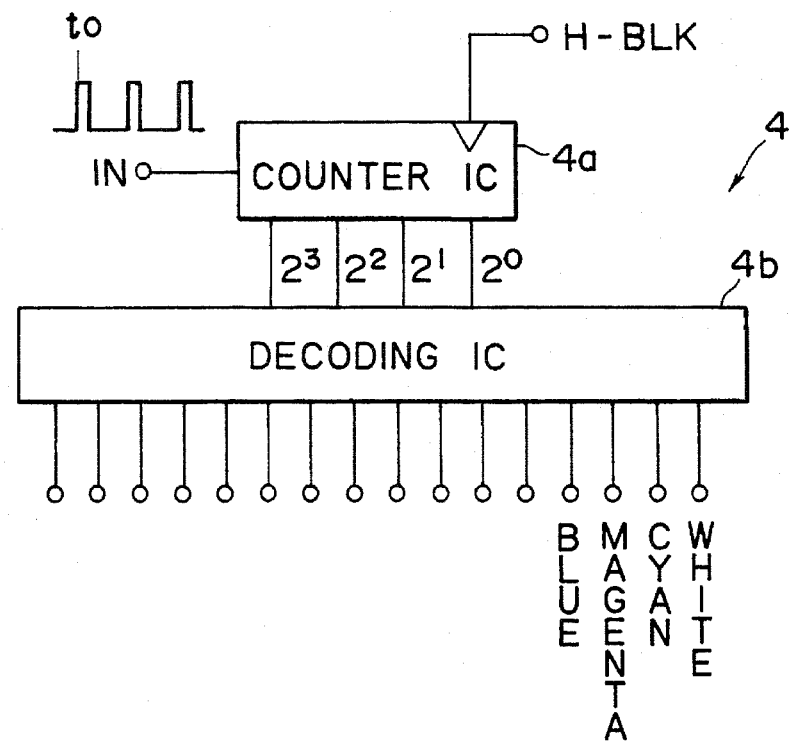
Figure 2F:
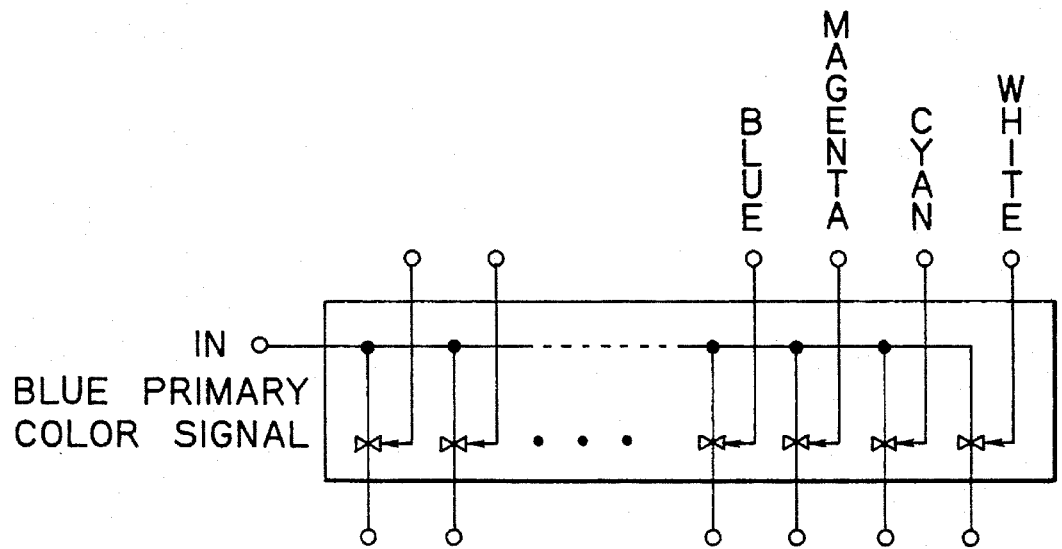
Figure 3:
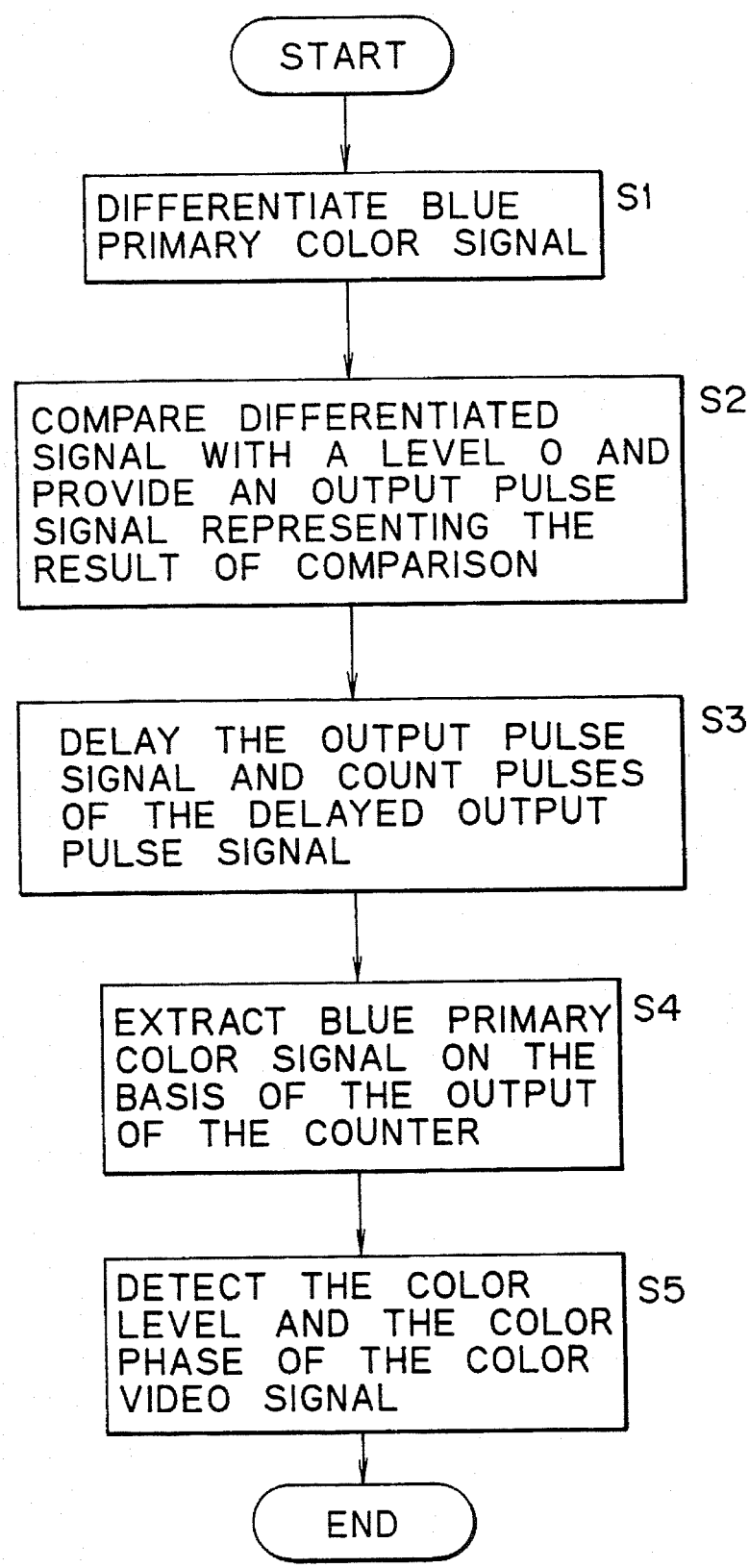
FIG. 3 is a flow chart of a color video signal detecting procedure to be carried out by the color video signal detector of FIG. 1.
Figure 4:
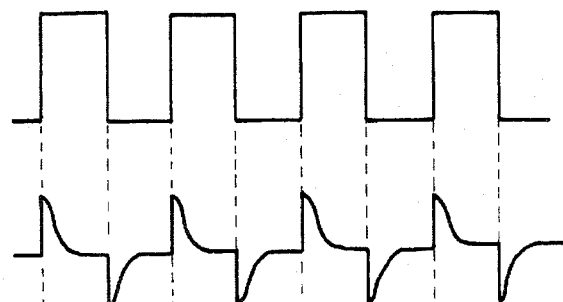
FIG. 4 is a diagram to assist in explaining signals handled by the color video signal detector in carrying out the color video signal detecting procedure of FIG. 3.
Figure 4:
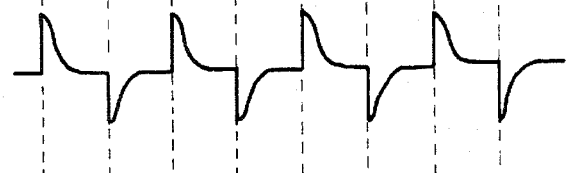
Figure 4:
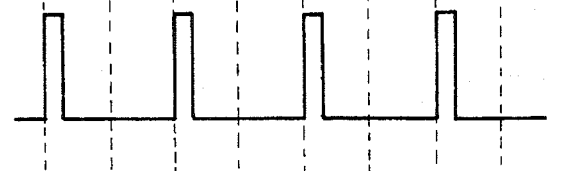
Figure 4:
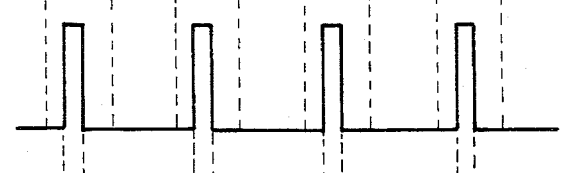
Figure 4:
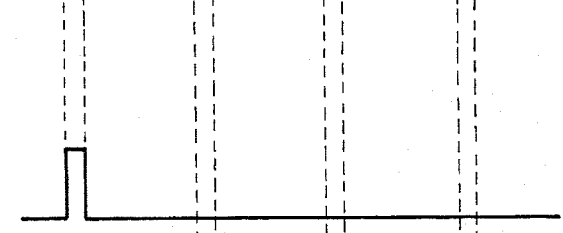
Figure 4:
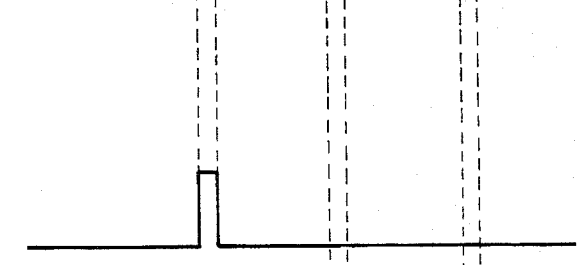
Figure 4:
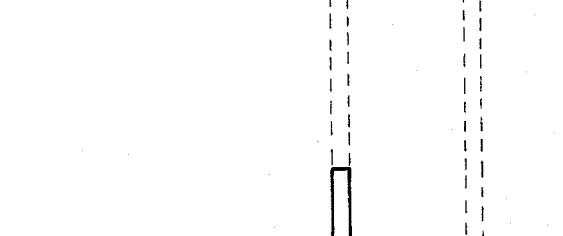
Figure 4:
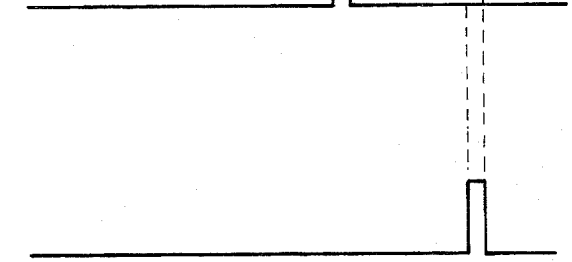
Figure 5:
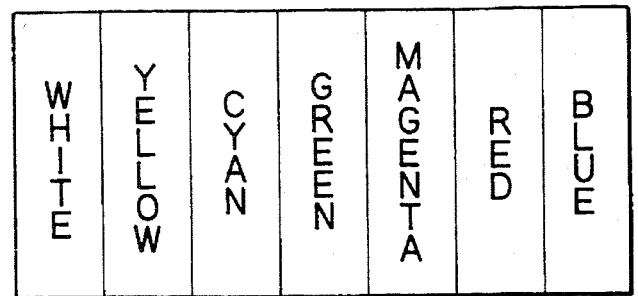
FIG. 5 is a diagram to assist in explaining a color bar signal.
Figure 5:
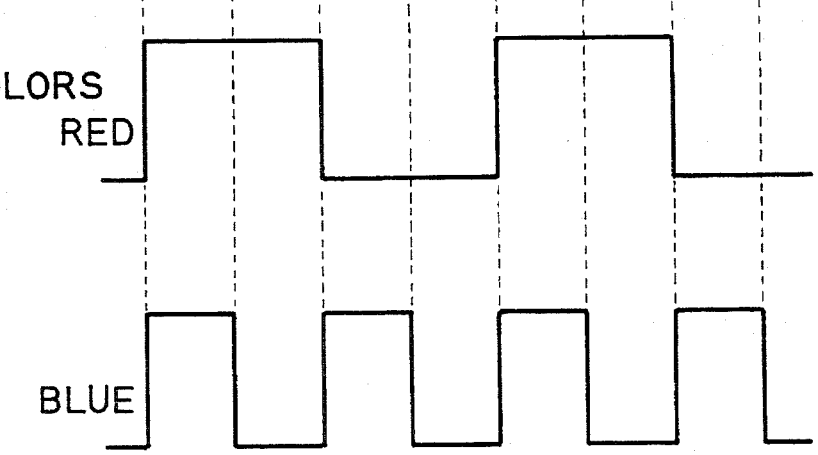

A color video signal detector in a preferred embodiment according to the present invention will be described with reference to the accompanying drawings, in which FIG. 1 is a block diagram showing the configuration of the color video signal detector, FIGS. 2A to 2F are circuit diagrams of a differentiating circuit, a delay circuit, a counter and a switching IC, respectively, included in the color video signal detector of FIG. 1, FIG. 3 is a flow chart of a color video signal detection procedure to be carried out by the color video signal detector of FIG. 1, and FIG. 4 is a timing chart to assist in explaining signals used by the color video signal detector in carrying out the color video signal detection procedure shown in FIG. 3.

Referring to FIG. 1, the color video signal detector comprises a differentiating circuit 1 that differentiates a blue primary color signal, a comparator 2 that compares output from the differentiating circuit 1 with a given value, such as level 0, and provides an active output pulse when the output from the differentiating circuit 1 is greater than the given value, a delay circuit 3 that delays the output pulse from the comparator 2 for a given time to provide a delayed pulse signal, a counter 4 for counting the delayed pulse signals provided by the delay circuit 3, a one-input four-output switching IC 5 that switches the blue primary color signal according to output from the counter 4 to provide a blue primary color signal on different terminals whenever the white, the cyan, the magenta and the blue bars of a color bar signal appear, A/D converters 6 to 9 that convert the analog blue primary color signals selectively given thereto by the switching IC 5 into digital signals, and a microcomputer 10 that detects the blue primary color signal level and time provided by each of the A/D converters 6 to 9 and enabling color level and color phase determination of a color video signal based on the results of the above detection.

For example, the differentiating circuit 1 comprises a capacitor $C_1$, and a resistor $R_1$ as shown in FIG. 2A. The comparator 2 has a differential amplifier 2a that receives the output from the differentiating circuit 1, compares the input with a given reference voltage E, and generates a pulse signal that becomes active when the input is greater than the reference voltage E as shown in FIG. 2B. The delay circuit 3 comprises a monostable multivibrator 3a, a capacitor $C_2$ and a resistor $R_2$ as shown in FIG. 2C. The delay time $t_o$ of the monostable multivibrator 3a is determined by the capacitor $C_2$ and the resistor $R_2$. The delay circuit 3 may comprise two inverters 3b and 3c as shown in FIG. 2D to delay the output with respect to the input. The counter 4 comprises a counter IC 4a that counts the delayed pulse signals provided by the delay circuit 3, and a decoder IC 4b that generates switching pulses corresponding to the white, the cyan, the magenta and the blue bar of a color bars signal by decoding the count provided by the counter IC 4a as shown in FIG. 2E. The switching IC 5 receives the switching pulses generated by the decoder IC 4b, determines the order of blue primary color signals according to times when the white, the cyan, the magenta and the blue bar of the color bar signal appears, and provides the blue primary color signals on different output terminals according to switching pulses as shown in FIG. 2F.

Operation of the color video signal detector constructed as disclosed above will be described with reference to FIGS. 3 and 4.

Referring to FIG. 3 showing a color video signal detecting procedure to be carried out by the color video signal detector, the differentiating circuit 1 differentiates a blue primary color signal shown in (a) of FIG. 4 in step S1 to provide a differential signal shown in (b) of FIG. 4. In step S2, the comparator 2 compares the differential signal obtained in step S1 with a level 0 in step S2 and provides a pulse signal shown in (c) of FIG. 4. In step S3, the delay circuit 3 delays the output pulse signal from the comparator 2 by a given time and gives a delayed pulse signal shown in (d) of FIG. 4 to the counter 4, and then the counter counts the pulses of the delayed pulse signal to quantify the pulses of the blue primary color signal whenever the white, the cyan, the magenta and the blue bars appear. The counter 4 is reset by a horizontal synchronizing signal H-BLK. In step S4, the switching IC 5 switches its output terminals numbered by the counter 4 to provide the input blue primary color signal sequentially to an output terminal for the white bar at a time shown in (e) of FIG. 4, an output terminal for the cyan bar at a time shown in (f) of FIG. 4, an output terminal for the magenta bar at time shown in (g) of FIG. 4 and at an output terminal for the blue bar at time shown in (h) of FIG. 4. The pulses of the blue primary color signal provided at times when the white, the cyan, the magenta and the blue bars appear are selectively converted into digital values by the A/D converters 6 to 9, and digital output signals are given to the microcomputer 10 to detect the blue primary color signal, level and time enabling color level and color phase determination of the color video signal based on the result of the detection in step S5.

Thus, the color video signal detector embodying the present invention differentiates the blue primary color signal directly to detect edges in the blue primary color signal and generates a pulse signal on the basis of the edges. Therefore, a pulse signal completely synchronous with the blue primary color signal can be provided and, consequently, the time when the pulse signal becomes active coincides with the time when the blue primary color signal is provided enabling the pulses of the blue primary color signal to be accurately extracted whenever the white, the cyan, the magenta and the blue bar appear, and hence the color level and the color phase of the color video signal can be detected and regulated.

Furthermore, since the pulse signal is generated based on the blue primary color signal, a pulse signal following the blue primary color signal for generating color bar signals for different color bar signals can be obtained. Thus, the color video signal detector having a simple configuration is capable of generating pulse signals corresponding to the color bar signals.

Although the invention has been described in its preferred form with a certain degree of particularity, obviously many changes and variations are possible therein. It is therefore to be understood that the present invention may be practiced otherwise than as specifically described herein without departing the scope and spirit thereof.

What is claimed is:

1. A color video signal detector for detecting color level and color phase of a color video signal, comprising:

edge detection means for detecting edges in the color video signal;

extraction means for holding values of the color video signal at times after a given time interval from the edges, counting an order of the edges and extracting a value of the color video signal at every count; and measurement means for measuring the values of the color video signal extracted by the extraction means.

2. A color video signal detector according to claim 1, wherein the edge detection means is a differentiating means for differentiating the color video signal.

3. A color video signal detector according to claim 2, further comprising a delay circuit for delaying an output signal from the differentiating means by the given time interval, and a counter for counting a delay of the output signal from the delay circuit, wherein a timing of an operation by the extraction means is controlled based on an output signal from the counter.

4. A color video signal detecting method that detects color level and color phase of a color video signal, comprising steps of:

detecting edges in the color video signal;

holding values of the color video signal at times after a given time interval from the edges, counting an order of the edges and extracting a held value of the color video signal at every count; and measuring the extracted values of the color video signal.

5. A color video signal detecting method according to claim 4, wherein the step of detecting edges in the color video signal comprises differentiating the color video signal.

* * * * *